Figures 1, 2:
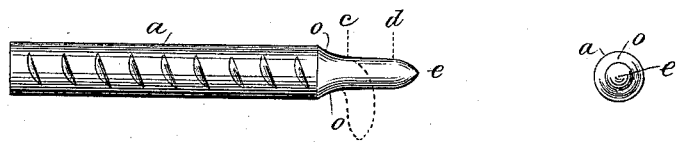

(No Model.)

L. J. ATWOOD.
FASTENING FOR SHOE SOLES.

No. 296,908. Patented Apr. 15, 1884.

Witnesses
Chas H. Smith
J. Stait

Inventor
Lewis J. Atwood
for Lemuel W. Serrell
Atty

UNITED STATES PATENT OFFICE.

LEWIS J. ATWOOD, OF WATERBURY, CONNECTICUT, ASSIGNOR TO THE PLUME & ATWOOD MANUFACTURING COMPANY, OF SAME PLACE.

FASTENING FOR SHOE-SOLES.

SPECIFICATION forming part of Letters Patent No. 296,908, dated April 15, 1884.

Application filed December 29, 1883. (No model.)

*To all whom it may concern:*

Be it known that I, LEWIS J. ATWOOD, of Waterbury, in the State of Connecticut, have invented an Improvement in Fastenings for Shoe-Soles, of which the following is a specification.

The soles of boots and shoes are often attached in place by wire nails having roughened or grooved bodies, and points that are cut off obliquely. In other instances the point is rounded sufficiently for driving, and sometimes the point has been sharpened in all directions or rounded; but it is not sufficiently strong or properly shaped for driving or for clinching, and the nails that are cut off obliquely do not always clinch in the proper manner when driven against the metal last.

My invention is made for obviating the difficulties that have been experienced with shoe nails or fastenings heretofore invented; and it consists in the wire nail or fastening having the peculiar point herein described.

In the drawings, Figure 1 is a side view of such nail or fastening; and Fig. 2, an end view, the same being of enlarged size.

The body $a$ of the nail or fastening is of wire, usually round with peripheral grooves or indentations to roughen the same sufficiently to hold the nail firmly in the leather. This roughening is well known in shoe nails or fastenings, and may be of any desired character. The point is turned off true, so as to be in line with the axis of the nail. The middle portion of the point is straight or slightly tapering from $c$ to $d$. The extreme point $e$ is a cone or conoid, as shown. The base of the point is flaring, as at $o$, so as to give strength to the point at its base. The middle part of the point is sufficiently strong to drive accurately, and the cone at the extreme point penetrates the leather. When the nail or fastening is driven into place, the point portion is bent over and clinched, as indicated by dotted lines, in consequence of coming into contact with the iron last. The point is not liable to become broken, and the clinched nails form very secure fastenings for the sole.

I do not claim a shoe-nail in which the wire is tapered from the cylindrical portion to the point. In my nail the sides of the point are compound curves in section, being curved inwardly at the base and outwardly at the sharpened end.

I claim as my invention—

The shoe nail or fastening, having a roughened body portion and a round point that is a gradual taper from the inward curve at the base to the sharpened end, substantially as set forth.

Signed by me this 22d day of December, A. D. 1883.

L. J. ATWOOD.

Witnesses:
ROBT. T. LATTIN,
A. E. FOGG.